(12) United States Patent
Li et al.

(10) Patent No.: US 11,929,788 B2
(45) Date of Patent: Mar. 12, 2024

(54) MICROWAVE PHOTONIC ISING MACHINE

(71) Applicant: INSTITUTE OF SEMICONDUCTORS, CHINESE ACADEMY OF SCIENCES, Beijing (CN)

(72) Inventors: Ming Li, Beijing (CN); Tengfei Hao, Beijing (CN); Yao Meng, Beijing (CN); Qizhuang Cen, Beijing (CN); Yitang Dai, Beijing (CN); Nuannuan Shi, Beijing (CN); Wei Li, Beijing (CN)

(73) Assignee: INSTITUTE OF SEMICONDUCTORS, CHINESE ACADEMY OF SCIENCES, Beijing (CN)

( * ) Notice: Subject to any disclaimer, the term of this patent is extended or adjusted under 35 U.S.C. 154(b) by 248 days.

(21) Appl. No.: 17/456,029

(22) Filed: Nov. 22, 2021

(65) Prior Publication Data
US 2022/0209872 A1   Jun. 30, 2022

(30) Foreign Application Priority Data

Dec. 31, 2020 (CN) .......................... 202011642838.2

(51) Int. Cl.
*H04B 10/70* (2013.01)
*G06N 10/00* (2022.01)
*H04B 10/548* (2013.01)

(52) U.S. Cl.
CPC ............. *H04B 10/70* (2013.01); *G06N 10/00* (2019.01); *H04B 10/548* (2013.01)

(58) Field of Classification Search
CPC ....... H04B 10/548; H04B 10/70; G06N 10/00
See application file for complete search history.

(56) References Cited

U.S. PATENT DOCUMENTS 11,017,309 B2 *  5/2021  Roques-Carmes .... G06N 3/045
11,086,966 B2 *  8/2021  Pelc ........................ G06F 17/16

OTHER PUBLICATIONS

Cen, Qizhuang, et al. Microwave Photonic Ising Machine, 2020, https://arxiv.org/abs/2011.00064 (Year: 2020).*

* cited by examiner

*Primary Examiner* — Gregory H Curran
(74) *Attorney, Agent, or Firm* — Christopher R. Christenson; Kelly, Holt & Chistenson, PLLC

(57) ABSTRACT

Disclosed is a microwave photonic Ising machine, including: a closed loop including a phase and electro-optical conversion module and a storage, correlation and photoelectric conversion module connected in turn; a laser light source configured to generate and input an optical signal to the phase and electro-optical conversion module; and a microwave pulse local oscillator source configured to generate and input a microwave pulse signal to the phase and electro-optical conversion module. The phase and electro-optical conversion module is configured to modulate the microwave pulse signal, the optical signal, and a phase-specific two-phase microwave pulse spin electrical signal input from the storage, correlation and photoelectric conversion module to obtain and input a phase-specific two-phase microwave pulse spin optical signal to the storage, correlation and photoelectric conversion module for storage and correlation. The phase-specific two-phase microwave pulse spin electrical signal corresponds to a minimum gain state of the microwave photonic Ising machine.

13 Claims, 12 Drawing Sheets

Number of rings

MICROWAVE PHOTONIC ISING MACHINE

CROSS-REFERENCE TO RELATED APPLICATION

This application claims the benefit of Chinese Patent Application No. 202011642838.2 filed on Dec. 31, 2020, the whole disclosure of which is incorporated herein by reference.

TECHNICAL FIELD

The present disclosure relates to a technical field of microwave photonics, and in particular to a microwave photonic Ising machine.

BACKGROUND

Combinatorial optimization problems widely exist in various aspects of modern society, such as transportation planning, circuit delivery, drug research and development, financial investment, circuit design, and artificial intelligence. Many combinatorial optimization problems are non-deterministic polynomial (NP) problems or NP complete problems. As the number of variables increases, the number of possible combinations may increase at an exponential or factorial rate. Therefore, a traditional von Neumann architecture computer may encounter difficulties in solving these problems because it needs to perform serial operation step by step, and the computation speed is slow. Moreover, with a large-scale industrial production and a complexity of a social network structure, the combinatorial optimization problems in production and life are becoming increasingly complex, and it is urgent to efficiently solve large-scale combinatorial optimization problems.

In recent years, researchers have proposed Ising machines based on different physical entities such as quantum superconducting circuits and optical parametric oscillators, in order to efficiently solve the combination optimization problems. An Ising machine based on a quantum superconducting circuit uses artificial atoms as a carrier of Ising spin, and uses a quantum tunneling effect to achieve quantum annealing and finally obtain a low energy state of a system, a representative of which is a quantum Ising machine launched by Dwave in Canada. However, quantum properties in the superconducting circuit are quite fragile, and it is difficult to achieve a long-term coherence in a large-scale superconducting circuit. In addition, each Ising spin is local in space, and a connection between arbitrary spins may not be directly achieved.

An Ising machine based on an optical parametric oscillator uses an optical pulse as a carrier of Ising spin, and maps the combinatorial optimization problem to gain and loss characteristics of the optical parametric oscillator. A minimum gain of the oscillator corresponds to an optimal solution of the combinatorial optimization problem. The Ising machine based on the optical parametric oscillator may achieve a large-scale programmable connection. However, it is susceptible to environmental changes such as temperature and vibration due to a short wavelength of the optical pulse as the carrier of spin. It is also difficult to achieve a long-term coherence in a large-scale optical parametric oscillator. Therefore, the Ising machines based on physical entities such as quantum superconducting circuits and optical parametric oscillators are difficult to achieve a unification of the large-scale programmable connection and the high coherence.

SUMMARY

In view of the existing technical problems, the present disclosure provides a microwave photonic Ising machine to at least partially solve the technical problems described above.

A microwave photonic Ising machine is provided, including: a closed loop comprising a phase and electro-optical conversion module and a storage, correlation and photoelectric conversion module connected in turn; a laser light source configured to generate an optical signal and input the optical signal to the phase and electro-optical conversion module; and a microwave pulse local oscillator source configured to generate a microwave pulse signal and input the microwave pulse signal to the phase and electro-optical conversion module; wherein the phase and electro-optical conversion module is configured to modulate the microwave pulse signal, the optical signal, and a phase-specific two-phase microwave pulse spin electrical signal input by the storage, correlation and photoelectric conversion module, so as to obtain a phase-specific two-phase microwave pulse spin optical signal, and input the phase-specific two-phase microwave pulse spin optical signal to the storage, correlation and photoelectric conversion module for further storage and correlation; and wherein the phase-specific two-phase microwave pulse spin electrical signal corresponds to a minimum gain state of the microwave photonic Ising machine.

Optionally, the phase and electro-optical conversion module comprises a modulator and a nonlinear medium, the storage, correlation and photoelectric conversion module comprises an optical fiber, a signal correlation device and a photodetector, the signal correlation device comprises a beam splitting device, a spin connection module and a beam combining device, one output of the beam splitting device is connected to an input of the spin connection module, another output of the beam splitting device is connected to an input of the beam combining device, and an output of the spin connection module is connected to the input of the beam combining device; the nonlinear medium is configured to convert the microwave pulse signal into a phase-random two-phase microwave pulse spin signal, the modulator is configured to modulate the phase-random two-phase microwave pulse spin signal and the optical signal into a phase-random two-phase microwave pulse spin optical signal, and the optical fiber is configured to store the phase-random two-phase microwave pulse spin optical signal, wherein the spin connection module is configured to correlate any two phase-random two-phase microwave pulse spin optical signals input into the spin connection module, so as to generate a phase-specific two-phase microwave pulse spin optical signal, the photodetector is configured to convert the phase-specific two-phase microwave pulse spin optical signal output by the beam combining device into the phase-specific two-phase microwave pulse spin electrical signal and output the phase-specific two-phase microwave pulse spin electrical signal to the nonlinear medium so as to form a closed loop, and a position of the optical fiber is exchangeable with a position of the signal correlation device; or the photodetector is configured to convert the phase-random two-phase microwave pulse spin optical signal into a phase-random two-phase microwave pulse spin electrical signal, the spin connection module is configured to correlate any two phase-random two-phase microwave pulse spin electrical signals input into the spin connection module, so as to generate the phase-specific two-phase microwave pulse spin electrical signal, and the beam combining device is configured to output the phase-specific two-phase microwave pulse spin electrical signal to the nonlinear medium so as to form the closed loop.

Optionally, the phase and electro-optical conversion module comprises a modulator and a nonlinear medium, the storage, correlation and photoelectric conversion module comprises an optical fiber, a signal correlation device and a photodetector, the signal correlation device comprises a beam splitting device, a spin connection module and a beam combining device, one output of the beam splitting device is connected to an input of the spin connection module, another output of the beam splitting device is connected to an input of the beam combining device, and an output of the spin connection module is connected to the input of the beam combining device; the modulator is configured to modulate the microwave pulse signal and the optical signal into a microwave pulse optical signal, the nonlinear medium is configured to convert the microwave pulse optical signal into a phase-random two-phase microwave pulse spin optical signal, and the optical fiber is configured to store the phase-random two-phase microwave pulse spin optical signal, wherein the spin connection module is configured to correlate any two phase-random two-phase microwave pulse spin optical signals input into the spin connection module, so as to generate a phase-specific two-phase microwave pulse spin optical signal corresponding to the minimum gain state of the microwave photonic Ising machine, the photodetector is configured to convert the phase-specific two-phase microwave pulse spin optical signal output by the beam combining device into the phase-specific two-phase microwave pulse spin electrical signal and output the phase-specific two-phase microwave pulse spin electrical signal to the modulator so as to form a closed loop, and a position of the optical fiber is exchangeable with a position of the signal correlation device; or the photodetector is configured to convert the phase-random two-phase microwave pulse spin optical signal into a phase-random two-phase microwave pulse spin electrical signal, the spin connection module is configured to correlate any two phase-random two-phase microwave pulse spin electrical signals input into the spin connection module, so as to generate the phase-specific two-phase microwave pulse spin electrical signal corresponding to the minimum gain state of the microwave photonic Ising machine, and the beam combining device is configured to output the phase-specific two-phase microwave pulse spin electrical signal to the modulator so as to form a closed loop.

Optionally, a loss of the optical fiber is less than or equal to 0.2 dB/km.

Optionally, the two phases are 0 or $\pi$.

Optionally, the spin connection module is a programmable network comprising a one-way or at-least-two-way delay line network or comprising a feedback correlation network, and the programmable network is configured to perform a programmable correlation on the phase-random two-phase microwave pulse spin optical signal or the phase-random two-phase microwave pulse spin electrical signal.

Optionally, a part between the laser light source and the photodetector in which the optical signal passes is an optical path, the optical path further comprises one or at least two optical amplifiers for promoting a start oscillation; and a part between the photodetector and the modulator in which the electrical signal passes is a circuit, the circuit further comprises one or at least two electrical amplifiers and one or at least two electrical filters, the electrical filter is configured to filter the electrical signal, and a position of the electrical amplifier in the circuit is exchangeable with a position of the electrical filter in the circuit.

Optionally, the beam splitting device comprises a beam splitter and a wavelength division demultiplexer, and the beam combining device comprises a beam combiner and a wavelength division multiplexer.

Optionally, the laser light source is replaced with a laser pulse light source, and at a same time, the microwave pulse local oscillator source is replaced with a microwave local oscillator source; or the microwave pulse local oscillator source is replaced with a microwave local oscillator source, and at a same time, a pulse shaping device is further provided in the microwave photonic Ising machine; or the laser light source is replaceable with a laser pulse light source, and a synchronization device is further provided to synchronize a pulse of the laser pulse light source with a pulse of the microwave pulse local oscillator source.

A method of solving a combinatorial optimization problem is further provided, comprising: generating an optical signal by a laser light source, inputting the optical signal to a storage, correlation and photoelectric conversion module through a phase and electro-optical conversion module, converting the optical signal into an electrical signal and inputting the electrical signal to the phase and electro-optical conversion module, so as to cause an oscillation of a closed loop; generating a microwave pulse signal by a microwave pulse local oscillator source, and converting, by the phase and electro-optical conversion module, the microwave pulse signal, the optical signal and the electrical signal into a phase-random two-phase microwave pulse spin optical signal, wherein the phase-random two-phase microwave pulse spin optical signal is stored and correlated by the storage, correlation and photoelectric conversion module to generate a phase-specific two-phase microwave pulse spin optical signal, and the phase-specific two-phase microwave pulse spin optical signal is converted into a phase-specific two-phase microwave pulse spin electrical signal; or the phase-random two-phase microwave pulse spin optical signal is converted into a phase-random two-phase microwave pulse spin electrical signal, and the phase-random two-phase microwave pulse spin electrical signal is correlated to generate a phase-specific two-phase microwave pulse spin electric signal; and outputting the phase-specific two-phase microwave pulse spin electrical signal to the phase and electro-optical conversion module so as to form a closed microwave photonic loop, wherein a gain of the microwave photonic loop is gradually increased so that the phase-random two-phase microwave pulse spin optical signal or the phase-random two-phase microwave pulse spin electrical signal reaches a specific distribution corresponding to a minimum gain state of the microwave photonic loop, wherein the minimum gain corresponds to an optimal solution of the combinatorial optimization problem.

REFERENCE NUMERALS

Figure 1A:
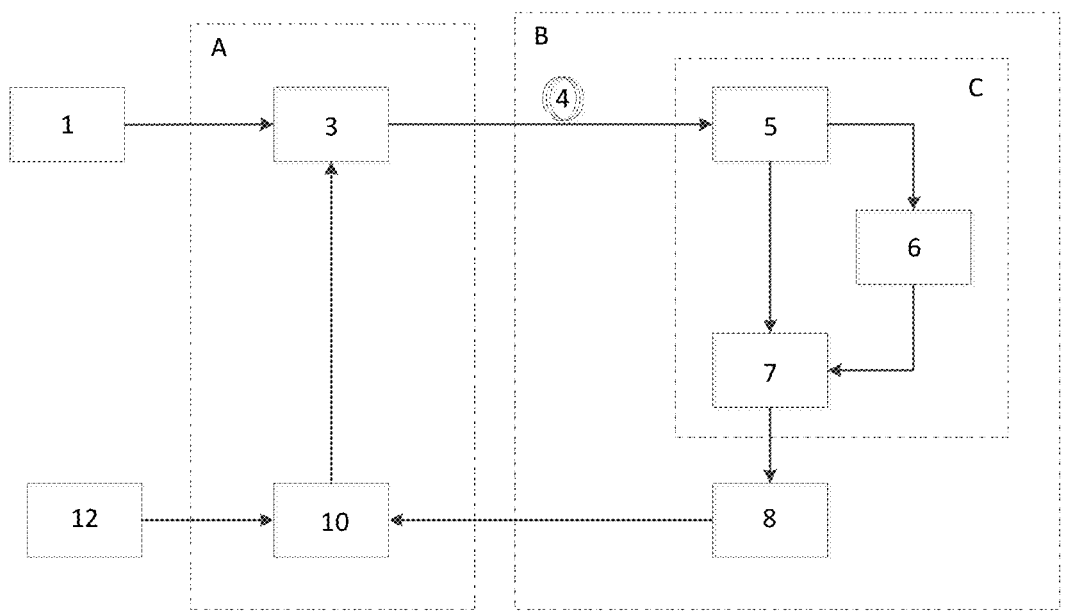
FIG. 1A-FIG. 1H schematically show structural diagrams of a microwave photonic Ising machine according to embodiments of the present disclosure.

1—laser light source
2—pulse shaping device
3—modulator
4—optical fiber
5—beam splitting device
6—spin connection module
7—beam combining device
8—photodetector
9—electrical amplifier
10—nonlinear medium
11—electrical filter
12—microwave pulse local oscillator source
12'—microwave local oscillator source
A—phase and electro-optical conversion module
B—storage, correlation and photoelectric conversion module
C—signal correlation device

DETAILED DESCRIPTION OF EMBODIMENTS

In order to make objectives, technical solutions and advantages of the present disclosure more apparent, the present disclosure will be further described in detail below in combination with specific embodiments and with reference to the drawings.

It should be noted that in the drawings or the description, the same reference numerals are used for similar or identical parts. In case of no conflict, the technical features in each embodiment illustrated in the description may be freely combined to form a new solution. In addition, each claim may be used as an embodiment alone or the technical features in each claim may be combined as a new embodiment. In the drawings, a shape or a thickness of the embodiment may be enlarged, and it is indicated for simplicity or convenience. Furthermore, elements or implementations not shown or described in the drawings are in the form known to those ordinary skilled in the art. Additionally, although an example of a parameter including a particular value may be provided herein, it should be understood that the parameter needs not to be exactly equal to the corresponding value, but may approximate the corresponding value within an acceptable tolerance or design constraint.

Unless there are technical obstacles or contradictions, the various embodiments of the present disclosure described above may be freely combined to form additional embodiments, and these additional embodiments are all within the protection scope of the present disclosure.

Although the present disclosure is described with reference to the drawings, the embodiments disclosed in the drawings are for illustrative purposes only and are not to be construed as limiting the present disclosure. Size ratios in the drawings are only schematic and should not be construed as limiting the present disclosure.

Although some embodiments of the general concept of the present disclosure have been illustrated and described, it should be understood by those ordinary skilled in the art that these embodiments may be changed without departing from the principle and spirit of the general concept of the present disclosure. The scope of the present disclosure is defined by the claims and their equivalents.

FIG. 1A-FIG. 1H schematically show a structural diagram of a microwave photonic Ising machine according to the embodiments of the present disclosure. As shown in FIG. 1A, the microwave photonic Ising machine according to the embodiments of the present disclosure includes: a closed loop including a phase and electro-optical conversion module A and a storage, correlation and photoelectric conversion module B connected in turn. According to the embodiments of the present disclosure, an output of a laser light source 1 is connected to an input of the phase and electro-optical conversion module A, an output of a microwave pulse local oscillator source 12 is connected to the input of the phase and electro-optical conversion module A, an output of the phase and electro-optical conversion module A is connected to an input of the storage, correlation and photoelectric conversion module B, and an output of the storage, correlation and photoelectric conversion module B is connected to the input of the phase and electro-optical conversion module A.

According to the embodiments of the present disclosure, the microwave photonic Ising machine further includes: a laser light source 1 configured to generate an optical signal and input the optical signal to the phase and electro-optical conversion module A; and a microwave pulse local oscillator source 12 configured to generate a microwave pulse signal and input the microwave pulse signal to the phase and electro-optical conversion module A. The phase and electro-optical conversion module A is configured to modulate the microwave pulse signal, the optical signal, and a phase-specific two-phase microwave pulse spin electrical signal input from the storage, correlation and photoelectric conversion module B, so as to obtain a phase-specific two-phase microwave pulse spin optical signal, and input the phase-specific two-phase microwave pulse spin optical signal to the storage, correlation and photoelectric conversion module B for further storage and correlation. The phase-specific two-phase microwave pulse spin electrical signal corresponds to a minimum gain state of the microwave photonic Ising machine.

According to the embodiments of the present disclosure, as shown in FIG. 1A, the phase and electro-optical conversion module A includes, for example, a modulator 3 and a nonlinear medium 10. The storage, correlation and photoelectric conversion module B includes, for example, an optical fiber 4, a signal correlation device C, and a photodetector 8. The signal correlation device C includes, for example, a beam splitting device 5, a spin connection module 6, and a beam combining device 7. One output of the beam splitting device 5 is connected to an input of the spin connection module 6, another output of the beam splitting device 5 is connected to an input of the beam combining device 7, and an output of the spin connection module 6 is also connected to the input of the beam combining device 7.

In some embodiments of the present disclosure, as shown in FIG. 1A, the output of the laser light source 1 is connected to an input of the modulator 3, the output of the microwave pulse local oscillator source 12 is connected to an input of the nonlinear medium 10, an output of the nonlinear medium 10 is connected to the input of the modulator 3, an output of the modulator 3 is connected to one end of the optical fiber 4, the other end of the optical fiber 4 is connected to an input of the beam splitting device 5, an output of the beam combining device 7 is connected to an input of the photodetector 8, and an output of the photodetector 8 is connected to the input of the nonlinear medium 10.

According to the embodiments of the present disclosure, the nonlinear medium 10 is used to convert the microwave pulse signal generated by the microwave pulse local oscillator source 12 into a phase-random two-phase microwave pulse spin signal, the modulator 3 is used to modulate the phase-random two-phase microwave pulse spin signal and the optical signal generated by the laser light source 1 into a phase-random two-phase microwave pulse spin optical signal, and the optical fiber 4 is used to store the phase-random two-phase microwave pulse spin optical signal.

The spin connection module 6 is used to correlate any two phase-random two-phase microwave pulse spin optical signals input into the spin connection module 6 so as to generate the phase-specific two-phase microwave pulse spin optical signal that corresponds to the minimum gain state of the microwave photonic Ising machine. The photodetector 8 is used to convert the phase-specific two-phase microwave pulse spin optical signal output from the beam combining device 7 into the phase-specific two-phase microwave pulse spin electrical signal, and output the phase-specific two-phase microwave pulse spin electrical signal to the nonlinear medium 10 so as to form a closed loop for next cycle.

Figure 1B:
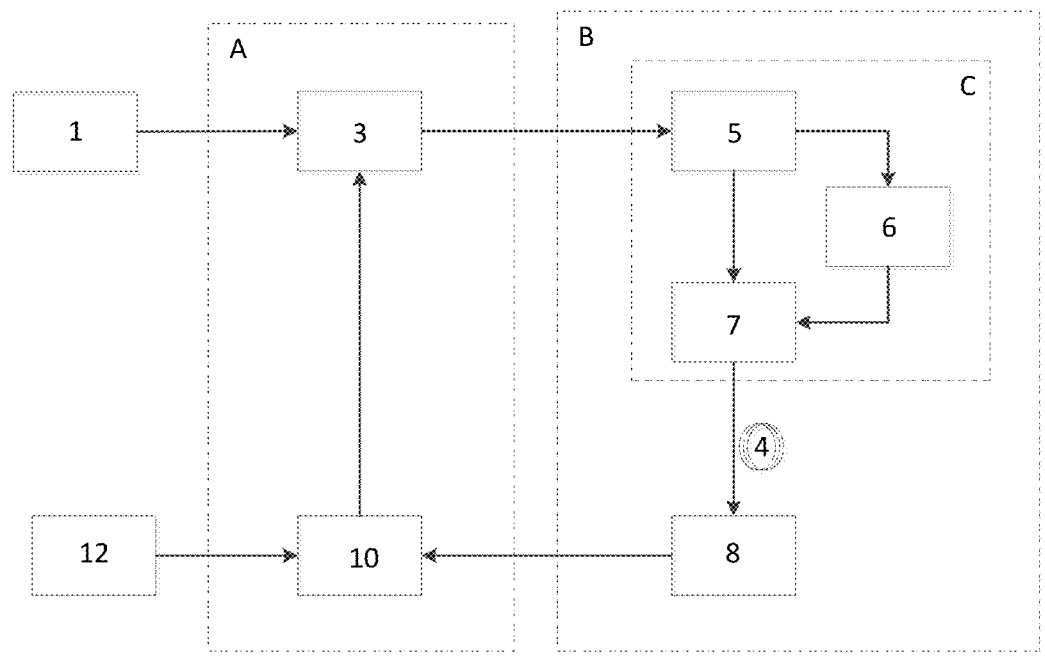

As shown in FIG. 1B, a position of the optical fiber 4 may be exchanged with a position of the signal correlation device C. In this case, the spin connection module 6 first correlates any two phase-random two-phase microwave pulse spin optical signals input into the spin connection module 6, so as to generate the phase-specific two-phase microwave pulse spin optical signal that corresponds to the minimum gain state of the microwave photonic Ising machine. The phase-specific two-phase microwave pulse spin optical signal is then stored in the optical fiber 4 and further output to the photodetector 8.

Figure 1C:
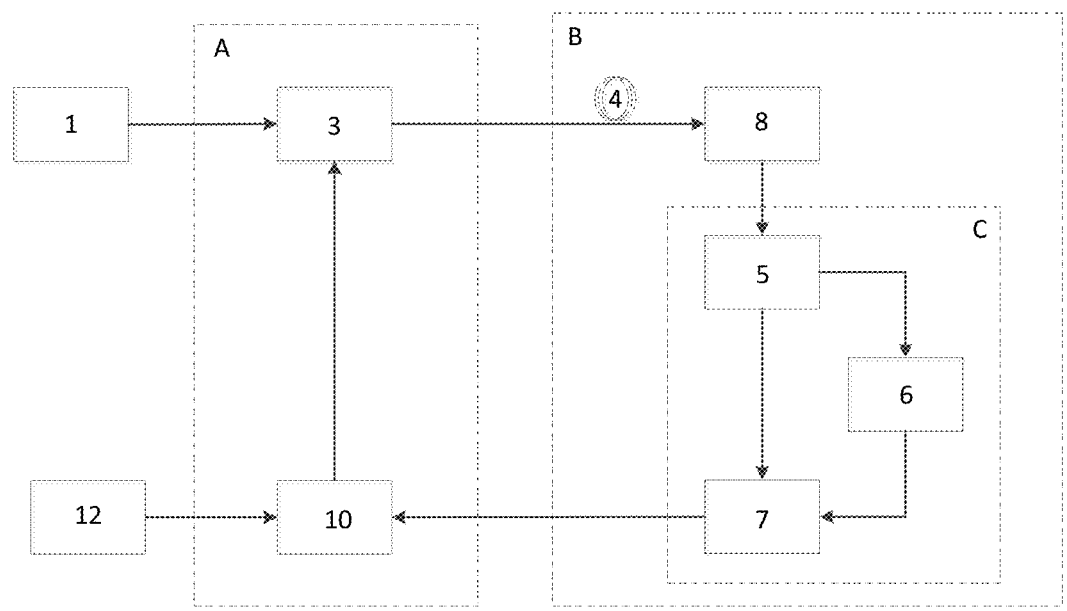

Alternatively, as shown in FIG. 1C, the other end of the optical fiber 4 is connected to the input of the photodetector 8, the output of the photodetector 8 is connected to the input of the beam splitting device 5, and the output of the beam combining device 7 is connected to the input of the nonlinear medium 10.

According to the embodiments of the present disclosure, the nonlinear medium 10 is used to convert the microwave pulse signal generated by the microwave pulse local oscillator source 12 into the phase-random two-phase microwave pulse spin signal. The modulator 3 is used to modulate the optical signal generated by the laser light source 1 and the phase-random two-phase microwave pulse spin signal into the phase-random two-phase microwave pulse spin optical signal. The optical fiber 4 is used to store the phase-random two-phase microwave pulse spin optical signal. The photodetector 8 is used to convert the phase-random two-phase microwave pulse spin optical signal into a phase-random two-phase microwave pulse spin electrical signal. The spin connection module 6 is used to correlate any two phase-random two-phase microwave pulse spin electrical signals input into the spin connection module 6, so as to generate the phase-specific two-phase microwave pulse spin electrical signal corresponding to the minimum gain state of the microwave photonic Ising machine. The beam combining device 7 is used to output the phase-specific two-phase microwave pulse spin electrical signal to the nonlinear medium 10 so as to form the closed loop for next cycle.

According to the embodiments of the present disclosure, the nonlinear medium 10 is an element such as a mixer, etc., which is used to provide a parametric frequency conversion process and achieve a parametric frequency conversion of an oscillation signal under an excitation of a microwave local oscillator.

Figure 1D:
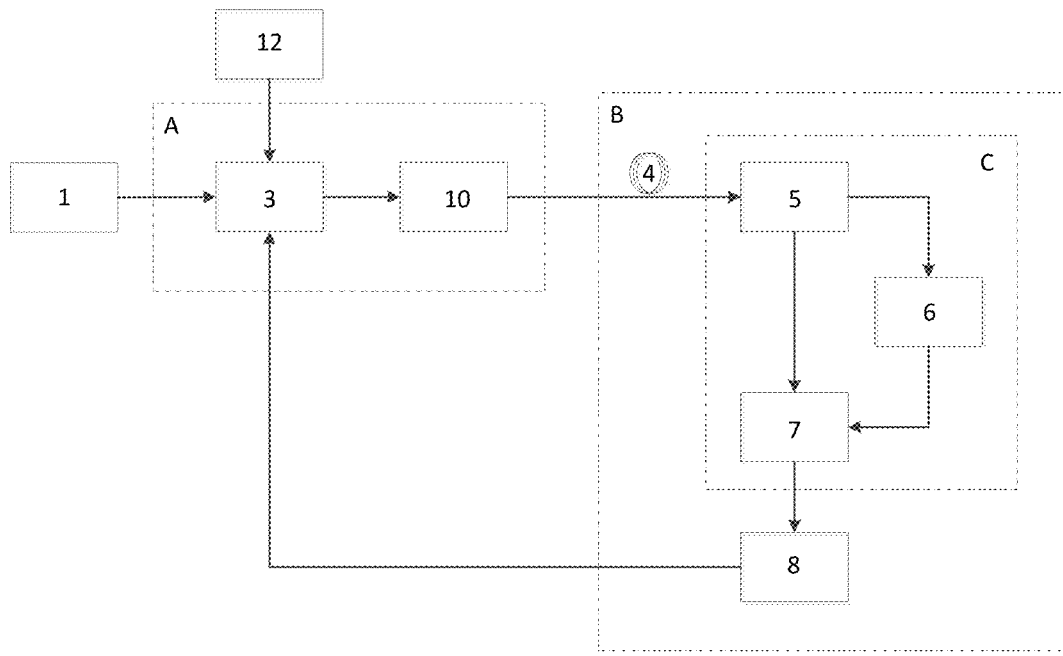

In some embodiments of the present disclosure, as shown in FIG. 1D, the output of the laser light source 1 is connected to the input of the modulator 3, the output of the microwave pulse local oscillator source 12 is connected to the input of the modulator 3, the output of the modulator 3 is connected to the input of the nonlinear medium 10, the output of the nonlinear medium 10 is connected to one end of the optical fiber 4, the other end of the optical fiber 4 is connected to the input of the beam splitting device 5, the output of the beam combining device 7 is connected to the input of the photodetector 8, and the output of the photodetector 8 is connected to the input of the modulator 3.

According to the embodiments of the present disclosure, the modulator 3 is used to modulate the microwave pulse signal generated by the microwave pulse local oscillator source 12 and the optical signal generated by the laser light source 1 into the microwave pulse optical signal. The nonlinear medium 10 is used to convert the microwave pulse optical signal into the phase-random two-phase microwave pulse spin optical signal. The optical fiber 4 is used to store the phase-random two-phase microwave pulse spin optical signal.

The spin connection module 6 is used to correlate any two phase-random two-phase microwave pulse spin optical signals input into the spin connection module 6, so as to generate the phase-specific two-phase microwave pulse spin optical signal corresponding to the minimum gain state of the microwave photonic Ising machine. The photodetector 8 is used to convert the phase-specific two-phase microwave pulse spin optical signal output by the beam combining device 7 into the phase-specific two-phase microwave pulse spin electrical signal and output the phase-specific two-phase microwave pulse spin electrical signal to the modulator 3 so as to form the closed loop for next cycle.

Figure 1E:
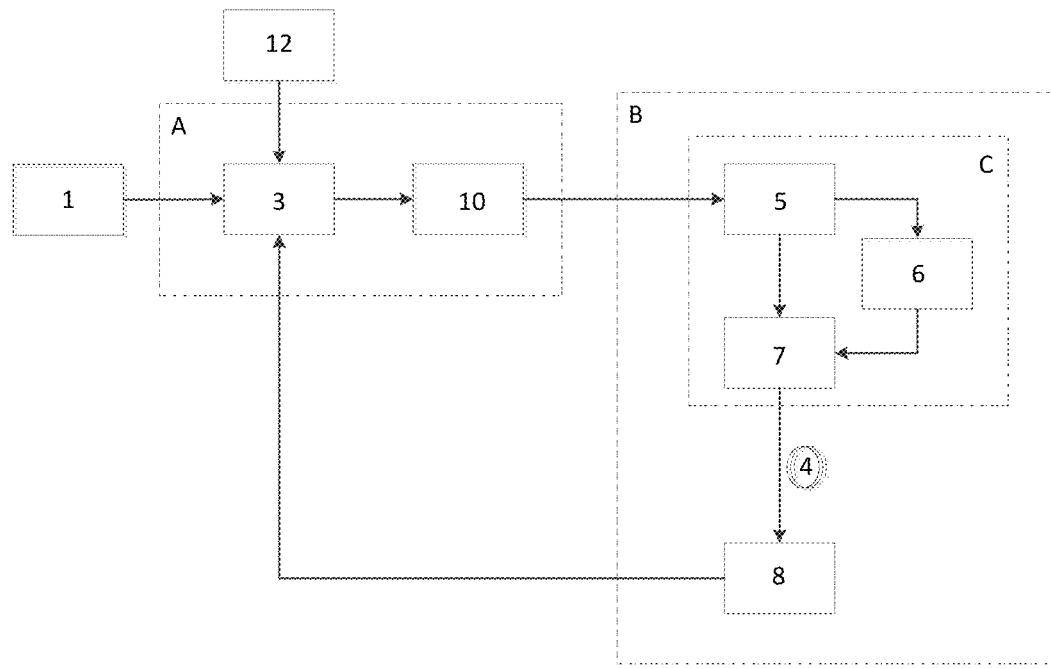

As shown in FIG. 1E, the position of the optical fiber 4 may be exchanged with the position of the signal correlation device C. In this case, the spin connection module 6 first correlates any two phase-random two-phase microwave pulse spin optical signals input into the spin connection module 6 so as to generate the phase-specific two-phase microwave pulse spin optical signal corresponding to the minimum gain state of the microwave photonic Ising machine. The phase-specific two-phase microwave pulse spin optical signal is then stored in the optical fiber 4 and further output to the photodetector 8.

Figure 1F:
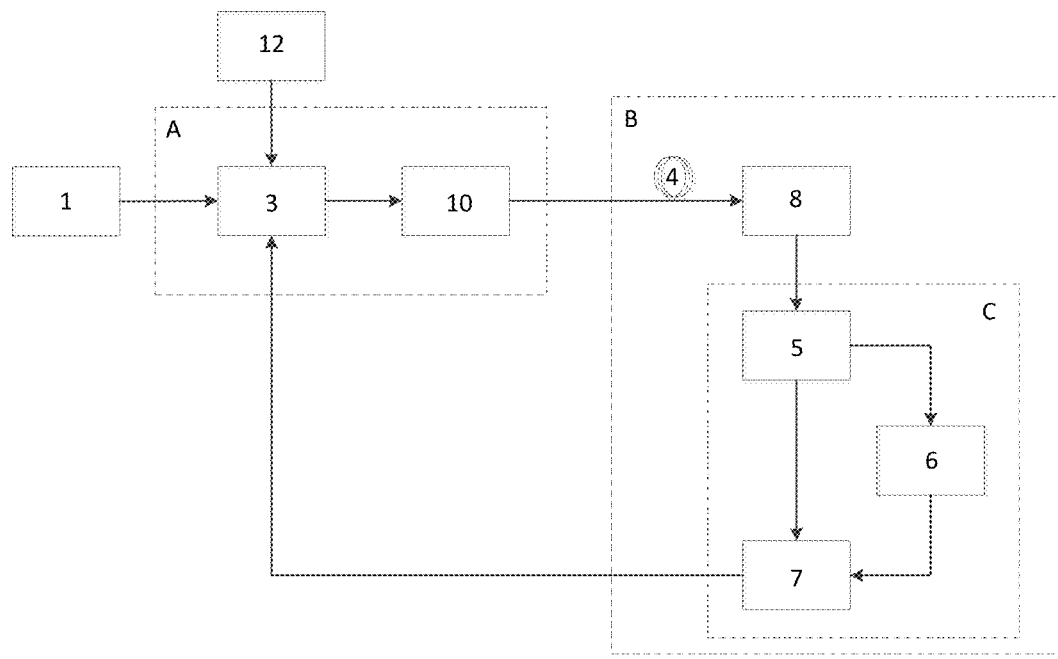

Alternatively, as shown in FIG. 1F, the other end of the optical fiber 4 is connected to the input of the photodetector 8, the output of the photodetector 8 is connected to the input of the beam splitting device 5, and the output of the beam combining device 7 is connected to the input of the modulator 3.

According to the embodiments of the present disclosure, the modulator 3 is used to convert the microwave pulse signal generated by the microwave pulse local oscillator source 12 and the optical signal generated by the laser light source 1 into the microwave pulse optical signal. The nonlinear medium 10 is used to convert the microwave pulse optical signal into the phase-random two-phase microwave pulse spin optical signal. The optical fiber 4 is used to store the phase-random two-phase microwave pulse spin optical signal. The photodetector 8 is used to convert the phase-random two-phase microwave pulse spin optical signal into the phase-random two-phase microwave pulse spin electrical signal. The spin connection module 6 is used to correlate any two phase-random two-phase microwave pulse spin electrical signals input into the spin connection module 6, so as to generate the phase-specific two-phase microwave pulse spin electrical signal corresponding to the minimum gain state of the microwave photonic Ising machine. The beam combining device 7 is used to output the phase-specific two-phase microwave pulse spin electrical signal to the modulator 3 so as to form the closed loop for next cycle.

In some embodiments of the present disclosure, a loss of the optical fiber 4 is less than or equal to 0.2 dB/km. By means of the optical fiber with the loss of less than or equal to 0.2 dB/km, a large number of two-phase microwave pulse spins may be stored in the microwave photonic Ising machine, thereby achieving a large-scale Ising spin.

Figure 1G:
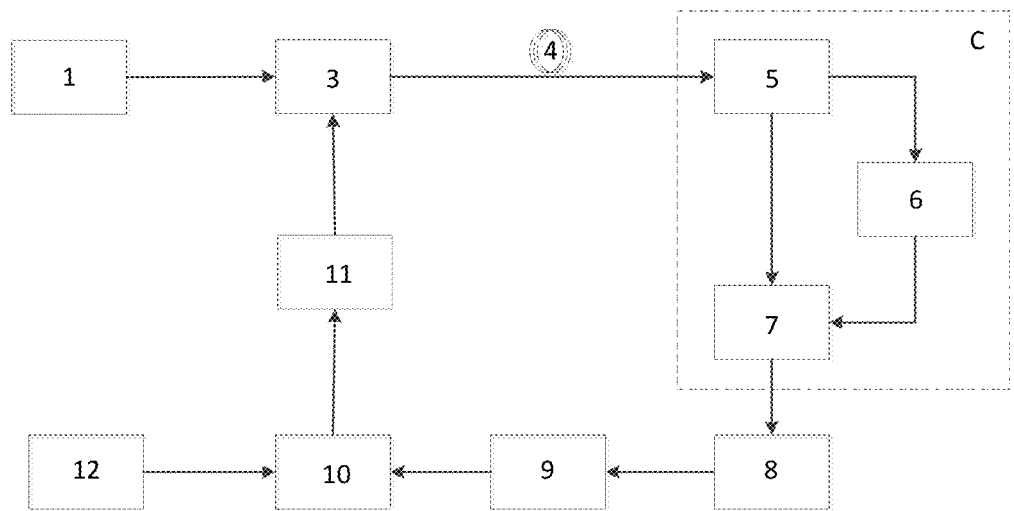

In some embodiments of the present disclosure, the two phases are 0 or π. As shown in FIG. 1G, the laser light source 1 emits an optical signal. Under an excitation of the optical signal, the optoelectronic parametric oscillator consisting of the modulator 3, the optical fiber 4, the photodetector 8, the nonlinear medium 10, the electrical filter 11 and the microwave pulse local oscillator source 12 generates the two-phase microwave pulse spin signal with a phase of 0 or π. Phase information of the microwave pulse spin signal is used as a carrier of the Ising spins and constitutes the microwave photonic Ising machine. Under an action of the spin connection module 6, each Ising spin may be flexibly connected so as to map an actual combinatorial optimization problem to gain and loss characteristics of the microwave photonic Ising machine. By gradually increasing the gain of the optoelectronic parametric oscillator, the optoelectronic parametric oscillator may operate in the minimum gain state. The minimum gain state corresponds to an optimal solution of the combinatorial optimization problem.

When the optoelectronic parametric oscillator operates in a degenerated state, that is, when a frequency at which the nonlinear medium 10 inputs and outputs signals is equal to half a frequency of the microwave pulse signal generated by the microwave pulse local oscillator source 12, a phase of the oscillation signal of the optoelectronic parametric oscillator may be expressed as:

$$\varphi_s = -\frac{\omega_s \tau}{2} + K\pi \quad (1)$$

where ωs is a frequency of the oscillation signal, τ is a delay of a ring, and K is a positive integer. Therefore, there are two possible values for the phase of the oscillation signal. When the microwave pulse local oscillator source 12 outputs the microwave pulse signal, the optoelectronic parametric oscillator also outputs a microwave pulse signal. At this time, a phase value of each microwave pulse signal may be expressed as 0 or π, and a probability that the phase of each microwave pulse signal takes 0 or π is the same. Therefore, the phase of the microwave pulse signal generated by the optoelectronic parametric oscillator is a physical entity with a binary degree of freedom, which may be used as the carrier of Ising spins to implement the microwave photonic Ising machine. Furthermore, since a wavelength of the microwave pulse is much greater than a wavelength of the optical pulse, an Ising network with high coherence may be achieved.

Figure 2:
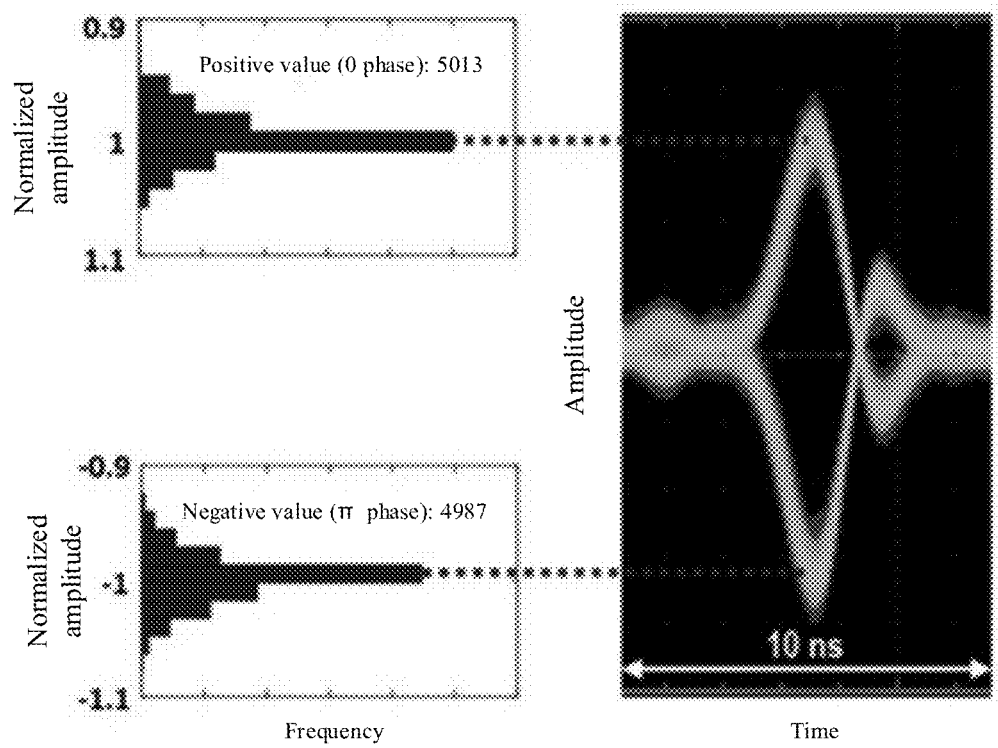
FIG. 2 schematically shows a diagram of a phase statistic result of a microwave pulse in case of no connection between each Ising spin according to the embodiments of the present disclosure.

FIG. 2 schematically shows a diagram of a phase statistic result of a microwave pulse in case of no connection between each Ising spin according to the embodiments of the present disclosure. As shown in FIG. 2, in the statistics, the microwave pulse signal is down-converted to a fundamental frequency, and a positive/negative amplitude of a time-domain waveform obtained therefrom respectively represents the 0 phase and the π phase. It can be seen that the frequency of 0 phase and the frequency of π phase calculated by statistics are basically the same. Therefore, when the optoelectronic parametric oscillator freely oscillates, it generates a two-phase microwave pulse signal with a random phase of 0 or π, the two-phase microwave pulse signal is a physical entity with a binary degree of freedom, and may be used as the carrier of the Ising spins of the microwave photonic Ising machine.

In some embodiments of the present disclosure, the spin connection module 6 is a programmable network including one or at least two delay line networks or including a feedback correlation network. The programmable network is used to perform a programmable correlation on the phase-random two-phase microwave pulse spin optical signal or the phase-random two-phase microwave pulse spin electrical signal. The beam splitting device 5 includes a beam splitter and a wavelength division demultiplexer, and the beam combining device 7 includes a beam combiner and a wavelength division multiplexer. That is, when the beam splitting device 5 is located in an optical path, the beam splitting device 5 may be an optical beam splitter or a wavelength division demultiplexer, and when the beam splitting device 5 is located in a circuit, the beam splitting device 5 may be a beam splitter. When the beam combining device 7 is located in the optical path, the beam combining device 7 may be an optical beam combiner or a wavelength division multiplexer, and when the beam combining device 7 is located in the circuit, the beam combining device 7 may be a beam combiner.

According to the embodiments of the present disclosure, when the signal correlation device C is located between the optical fiber 4 and the photodetector 8, that is, when the signal correlation device C is located in the optical path, the beam splitting device 5 and the beam combining device 7 may be respectively an optical beam splitter and an optical beam combiner to respectively split and combine the optical signals. One optical signal split from the optical beam splitter enters the spin connection module 6. The spin connection module 6 correlates any two optical signals entering the spin connection module 6 and outputs the phase-specific optical signal to the beam combining device 7. Another optical signal split from the optical beam splitter directly enters the beam combining device 7. The beam combining device 7 then outputs the phase-specific optical signals correlated by the spin connection module 6 to the photodetector 8.

Figure 3:
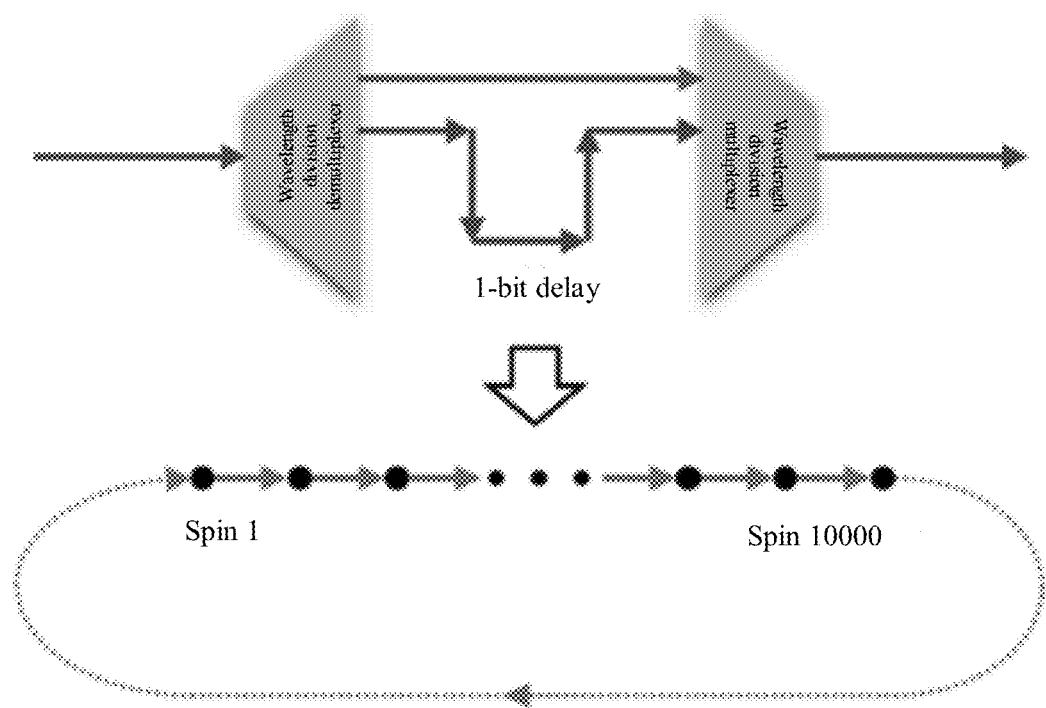
FIG. 3 schematically shows a diagram of a one-dimensional Ising model according to the embodiments of the present disclosure.
Figure 4:
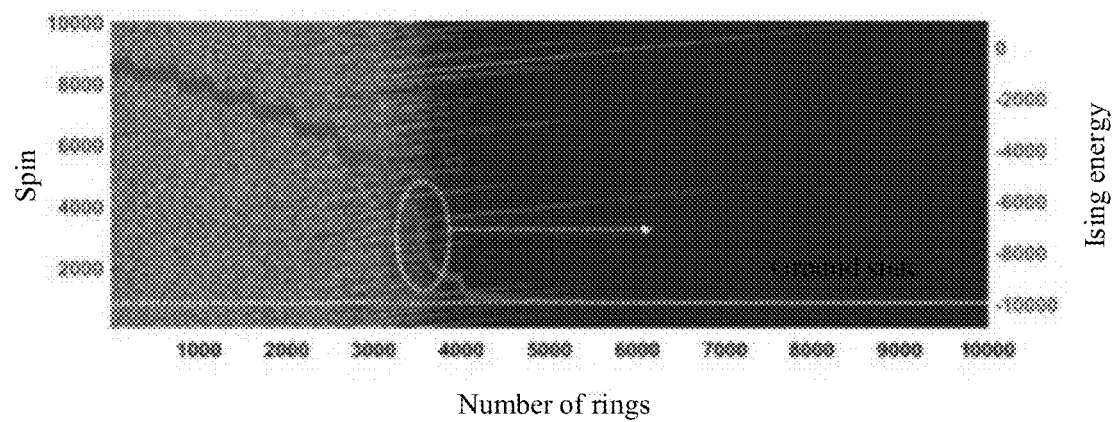
FIG. 4 schematically shows an evolution diagram of a spin phase and an Ising energy of a one-dimensional Ising model according to the embodiments of the present disclosure.

FIG. 3 schematically shows a diagram of a one-dimensional Ising model according to the embodiments of the present disclosure. As shown in FIG. 3, functions of the beam splitting device 5 and the beam combining device 7 may be implemented, for example, by a wavelength division demultiplexer and a wavelength division multiplexer, respectively. The spin connection module 6 controls a connection state of each spin, and the spin connection module is configured as a one-way delay line network. By providing a one-bit delay, that is, the delay equal to a time interval between two adjacent spins, each spins is correlated to form the one-dimensional Ising model. In this model, each spin is connected to a previous spin, and a last spin is connected to a first spin. Under this condition, an evolution of the spin phase and Ising energy of the microwave photonic Ising machine is shown in FIG. 4. It can be seen that after about 9000 cycles of transmission of the Ising spins in the optoelectronic parametric oscillator, all the spins have a common phase, and the energy of the system reaches a lowest state corresponding to a ground state, which successfully verifies a feasibility of the microwave photonic Ising machine.

Figure 5:
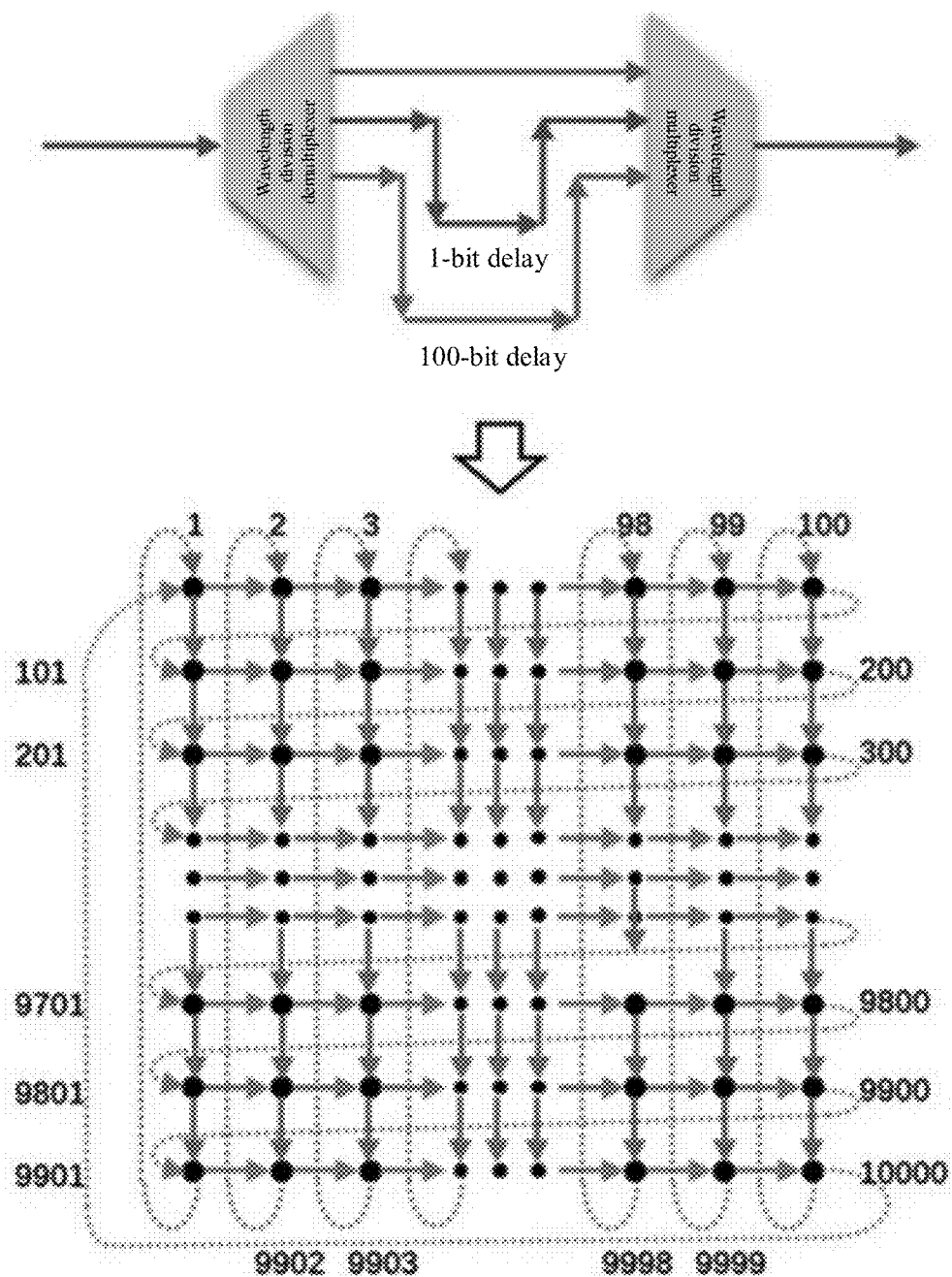
FIG. 5 schematically shows a diagram of a two-dimensional Ising model according to the embodiments of the present disclosure.
Figure 6:
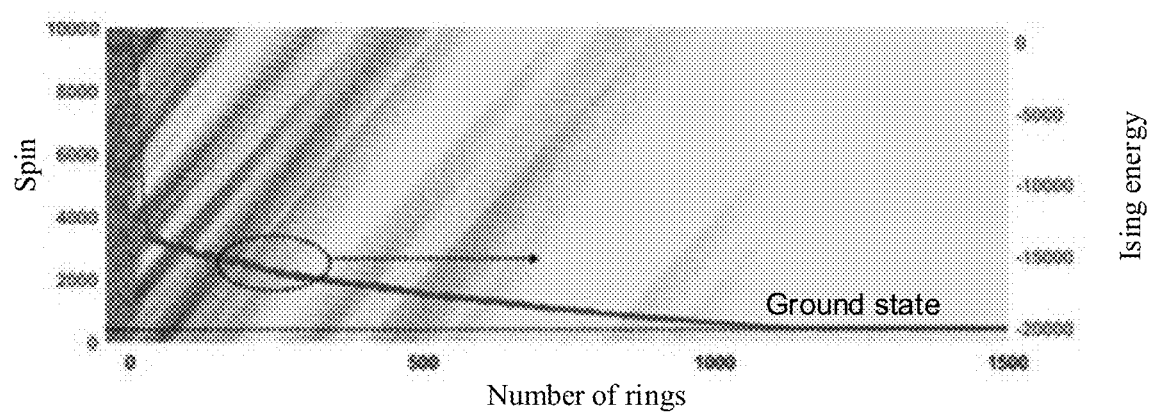
FIG. 6 schematically shows an evolution diagram of a spin phase and an Ising energy of a two-dimensional Ising model according to the embodiments of the present disclosure.

FIG. 5 schematically shows a diagram of a two-dimensional Ising model according to the embodiments of the present disclosure. As shown in FIG. 5, the spin connection module 6 is configured as a two-way delay line network providing a 1-bit delay and a 100-bit delay, so that each spin is correlated to form the two-dimensional Ising model. Compared with the one-dimensional Ising model, this model has an additional 100-bit delay, so that an i-$1_{th}$ and an i-$100_{th}$ spins are connected to the $i_{th}$ spin to form a two-dimensional grid-shaped correlation network. Under this condition, the evolution of the spin phase and Ising energy of the microwave photonic Ising machine is shown in FIG. 6. It can be seen that due to a closer correlation between the spins, the Ising spins may evolve to the ground state after about 1200 cycles of transmission in the optoelectronic parametric oscillator, which corresponds to a less time for solving the combinatorial optimization problem.

According to the embodiments of the present disclosure, by means of the spin connection module such as FPGA, etc., the microwave photonic Ising machine of the present disclosure may perform an arbitrary programmable connection on the Ising spins in the optoelectronic parametric oscillator by using programmability characteristics of the spin connection module such as the FPGA, etc. according to the requirements of the actual combinatorial optimization problem.

In some embodiments of the present disclosure, as shown in FIG. 1G, a part between the laser light source 1 and the photodetector 8 in which the optical signal passes is an optical path including one or at least two optical amplifiers for promoting a start oscillation. A part between the photodetector 8 and the modulator 3 in which the electrical signal passes is a circuit including one or at least two electrical amplifiers 9 and one or at least two electrical filters 11 for filtering the electrical signal. A position of the electrical amplifier 9 in the circuit may be exchanged with a position of the electrical filter 11 in the circuit.

Figure 1H:
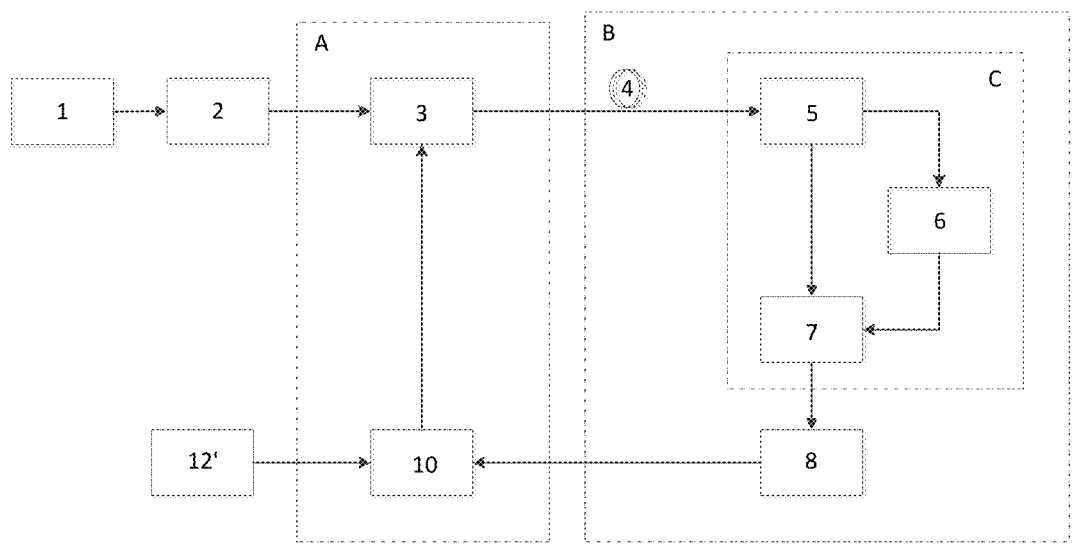

In some embodiments of the present disclosure, the laser light source 1 may be replaced with a laser pulse light source 1', and the microwave pulse local oscillator source 12 may be replaced with a microwave local oscillator source 12'. Alternatively, the laser light source 1 may be replaced with the laser pulse light source 1', and a synchronization device is further provided to synchronize a pulse of the laser pulse light source 1' with a pulse of the microwave pulse local oscillator source 12. Alternatively, as shown in FIG. 1H, the microwave pulse local oscillator source 12 is replaced with the microwave local oscillator source 12', and a pulse shaping device 2 is further provided in the microwave photonic loop. The pulse shaping device 2 may be located anywhere in the microwave photonic loop except for inside the signal correlation device C. That is, only if one of the laser light source and the microwave local oscillator source has the function of providing the pulse signal, or if the pulse shaping device 2 is provided in the microwave photonic loop to provide the pulse signal, the operation requirements of the optoelectronic parametric oscillator of the present disclosure may be satisfied. When both the laser light source and the microwave local oscillator source provide the pulse signal, these two pulse signals need to be synchronized to make the optoelectronic parametric oscillator operate normally.

In summary, the embodiments of the present disclosure provide a microwave photonic Ising machine. With the optoelectronic parametric oscillator consisting of the laser light source 1, the modulator 3, the optical fiber 4, the photodetector 8, the nonlinear medium 10, the electrical filter 11 and the microwave pulse local oscillator source 12, two-phase microwave pulse Ising spins may be generated. The optical fiber 4 has low loss characteristics and may store a large number of two-phase microwave pulse Ising spins, thereby achieving a large-scale Ising network. The spin connection module 6 may perform arbitrary programmable connections on the phase-random two-phase microwave pulse Ising spins in the optoelectronic parametric oscillator according to the requirements of the actual combinatorial optimization problem. Furthermore, since the wavelength of the microwave pulse generated by the microwave pulse local oscillator source 12 is much larger than the wavelength of the optical pulse, the Ising network with high coherence may be achieved. In this way, the microwave photonic Ising machine of the present disclosure achieves a unification of a large-scale programmable connection and a high coherence.

In order to meet the requirements for solving the combinatorial optimization problem, the embodiments of the present disclosure propose a microwave photonic Ising machine, which achieves the unification of a large-scale programmable connection and a high coherence to efficiently solve the combinatorial optimization problem. The microwave photonic Ising machine proposed by the embodiments of the present disclosure solves the combinatorial optimization problem by using laser generation characteristics of the laser light source, modulation characteristics of the modulator, photoelectric conversion characteristics of the photodetector, parametric frequency conversion characteristics of the nonlinear medium, and oscillation characteristics of the optoelectronic parametric oscillator.

Figure 7A:
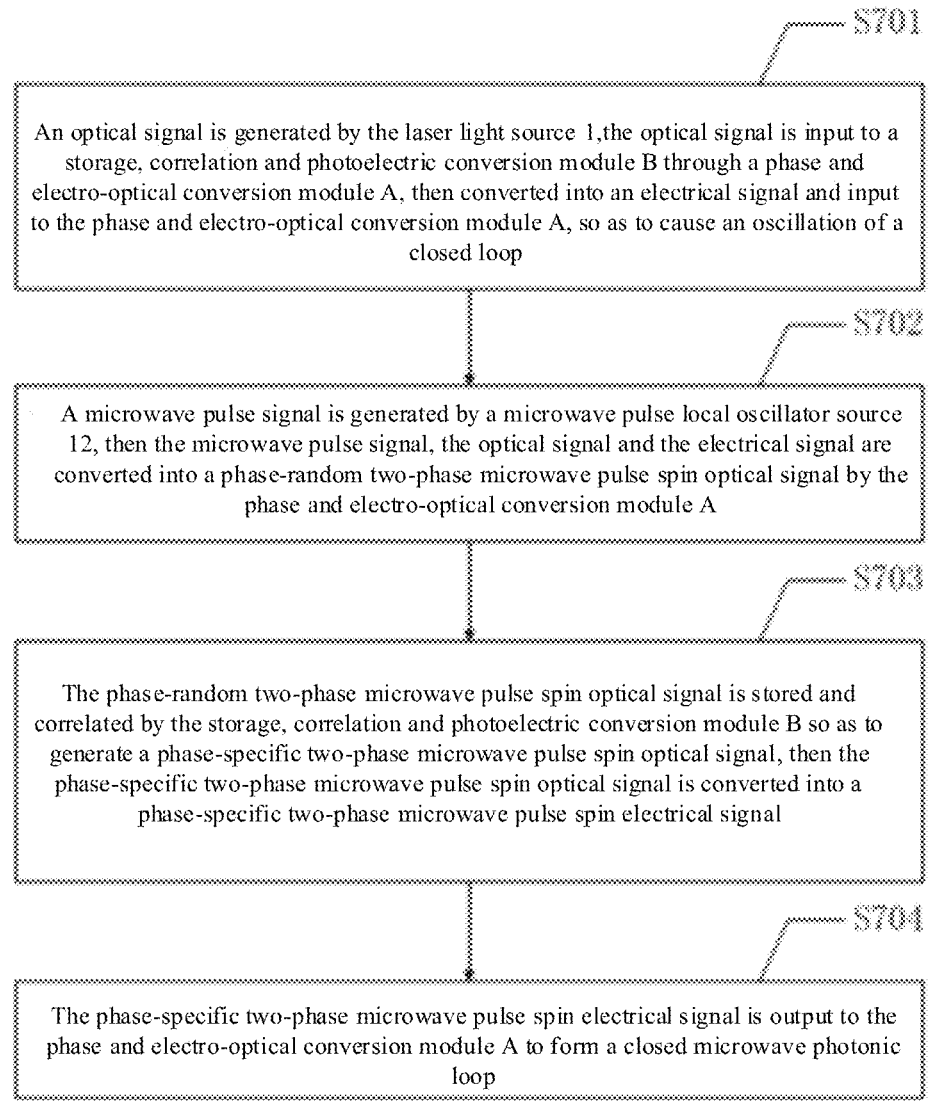
FIG. 7A-FIG. 7B schematically show flowcharts of a method of solving a combinatorial optimization problem according to the embodiments of the present disclosure.
Figure 7B:
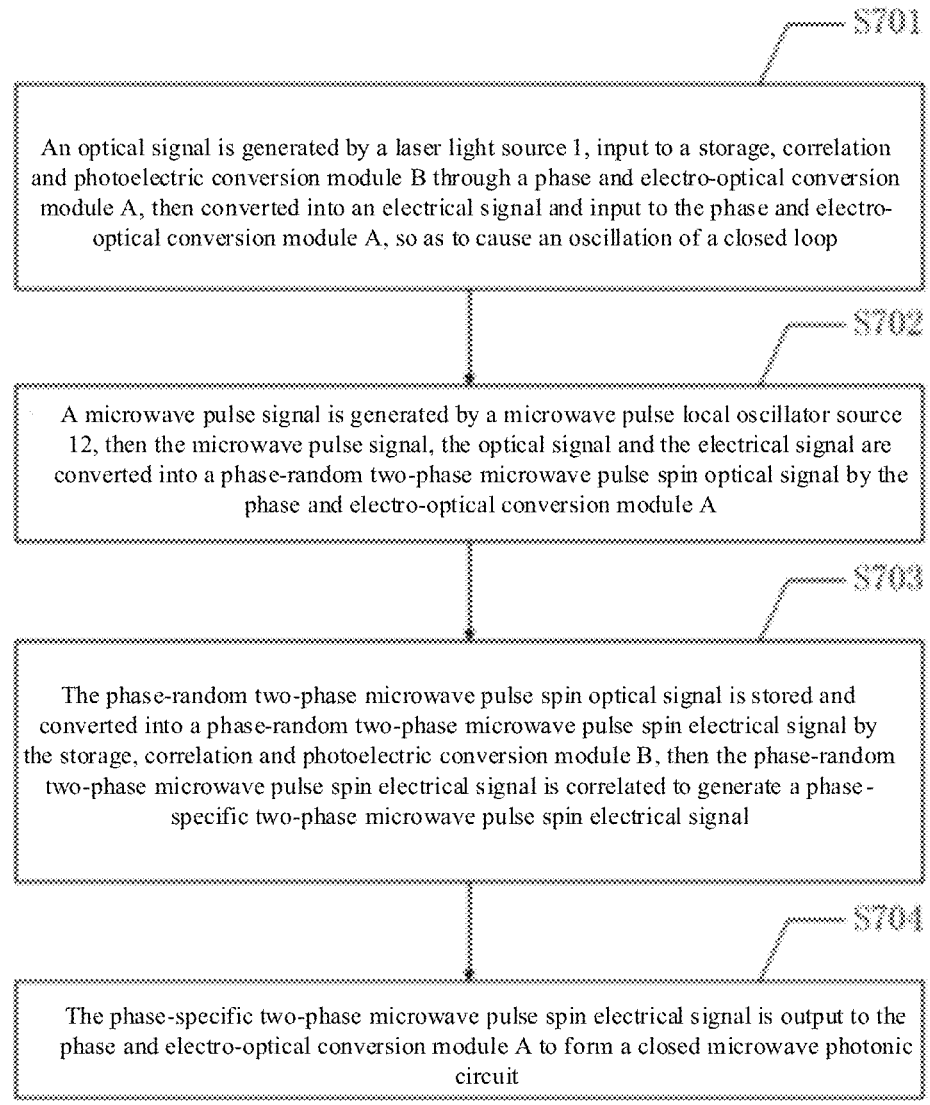

FIG. 7A-FIG. 7B schematically show flowcharts of a method of solving a combinatorial optimization problem according to the embodiment of the present disclosure. As shown in FIG. 7A, the method includes the following steps.

In S701, an optical signal is generated by a laser light source 1, the optical signal is input to a storage, correlation and photoelectric conversion module B through a phase and electro-optical conversion module A, then converted into an electrical signal and input to the phase and electro-optical conversion module A, so as to cause an oscillation of the closed loop.

In S702, a microwave pulse signal is generated by a microwave pulse local oscillator source 12, then the microwave pulse signal, the optical signal and the electrical signal are converted into a phase-random two-phase microwave pulse spin optical signal by the phase and electro-optical conversion module A.

In S703, the phase-random two-phase microwave pulse spin optical signal is stored and correlated by the storage, correlation and photoelectric conversion module B, so as to generate a phase-specific two-phase microwave pulse spin optical signal, then the phase-specific two-phase microwave pulse spin optical signal is converted into a phase-specific two-phase microwave pulse spin electrical signal.

In S704, the phase-specific two-phase microwave pulse spin electrical signal is output to the phase and electro-optical conversion module A to form a closed microwave photonic loop.

Alternatively, as shown in FIG. 7B, the method includes the following steps.

In S701, an optical signal is generated by a laser light source 1, the optical signal is input to a storage, correlation and photoelectric conversion module B through a phase and electro-optical conversion module A, then converted into an electrical signal and input to the phase and electro-optical conversion module A, so as to cause an oscillation of a closed loop.

In S702, a microwave pulse signal is generated by a microwave pulse local oscillator source 12, then the microwave pulse signal, the optical signal and the electrical signal are converted into a phase-random two-phase microwave pulse spin optical signal by the phase and electro-optical conversion module A.

In S703, the phase-random two-phase microwave pulse spin optical signal is stored and converted into a phase-random two-phase microwave pulse spin electrical signal by the storage, correlation and photoelectric conversion module B, then the phase-random two-phase microwave pulse spin electrical signal is correlated to generate a phase-specific two-phase microwave pulse spin electrical signal.

In S704, the phase-specific two-phase microwave pulse spin electrical signal is output to the phase and electro-optical conversion module A to form a closed microwave photonic loop.

Gain of the microwave photonic loop is gradually increased so that the phase-random two-phase microwave pulse spin optical signal or the phase-random two-phase microwave pulse spin electrical signal reaches a specific distribution corresponding to a minimum gain state of the microwave photonic loop. The minimum gain corresponds to the optimal solution of the combinatorial optimization problem.

Figure 8:
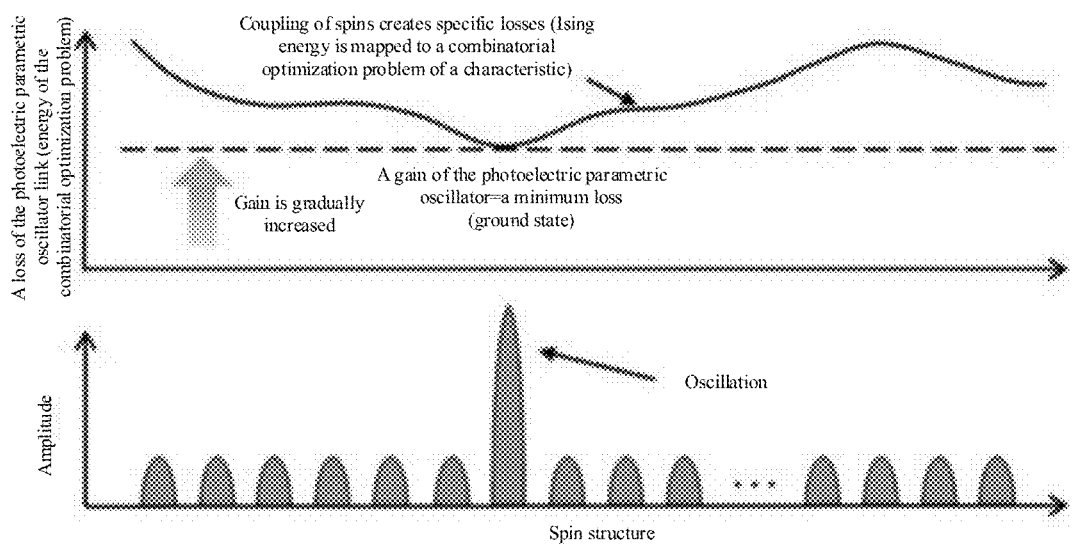
FIG. 8 schematically shows a working principle diagram of a microwave photonic Ising machine according to the embodiments of the present disclosure.

According to the embodiments of the present disclosure, when solving a specific combinatorial optimization problem, the correlation between the Ising spins is achieved through the spin connection module 6, thereby mapping the actual optimization problem to the microwave photonic Ising machine. Accordingly, a Hamiltonian of the microwave photonic Ising machine may be expressed as:

$$H = -\Sigma J_{ij}\sigma_i\sigma_j \quad (2)$$

where $J_{ij}$ is a coefficient of a correlation between an $i_{th}$ spin and a $j_{th}$ spin, and $\sigma_i$ and $\sigma_j$ are directions of the spins. It can be seen from formula (2) that different spin correlations correspond to different Hamiltonians, so the correlation between spins changes the gain and loss characteristics of the Ising machine. FIG. 8 schematically shows a working principle diagram of a microwave photonic Ising machine according to the embodiments of the present disclosure. As shown in FIG. 8, in this case, the actual combinatorial optimization problem is mapped to the gain and loss characteristics of the microwave photonic Ising machine, and the minimum gain of the optoelectronic parametric oscillator corresponds to the optimal solution of the combinatorial optimization problem.

The present disclosure provides a microwave photonic Ising machine, which has the following advantages over the related art.

1. The carrier of the Ising spins of the microwave photonic Ising machine of the present disclosure is the two-phase microwave pulse spin signal generated by the microwave photonic loop. Since the wavelength of the microwave pulse is much greater than the wavelength of the optical pulse, the Ising network with a high coherence may be achieved.
2. By means of the low-loss optical fiber, the microwave photonic Ising machine of the present disclosure may store a large number of spins generated by the phase and electro-optical conversion module, thereby achieving a large-scale Ising network.
3. By means of the storage, correlation and photoelectric conversion module, the microwave photonic Ising machine of the present disclosure may perform an arbitrary programmable connection to the Ising spins in the microwave photonic Ising machine according to requirements of an actual combinatorial optimization problem.

The specific embodiments mentioned above describe the objectives, technical solutions and advantages of the present disclosure in further detail. It should be understood that the above are only specific embodiments of the present disclosure and are not intended to limit the present disclosure. Any modifications, equivalent substitutions, improvements, etc., made within the spirit and scope of the present disclosure should fall within the scope of the present disclosure.

What is claimed is:

1. A microwave photonic Ising machine, comprising:
    a closed loop comprising a phase and electro-optical conversion module and a storage, correlation and photoelectric conversion module connected in turn;
    a laser light source configured to generate an optical signal and input the optical signal to the phase and electro-optical conversion module; and
    a microwave pulse local oscillator source configured to generate a microwave pulse signal and input the microwave pulse signal to the phase and electro-optical conversion module;
    wherein the phase and electro-optical conversion module is configured to modulate the microwave pulse signal, the optical signal, and a phase-specific two-phase microwave pulse spin electrical signal input by the storage, correlation and photoelectric conversion module, so as to obtain a phase-specific two-phase microwave pulse spin optical signal, and input the phase-specific two-phase microwave pulse spin optical signal to the storage, correlation and photoelectric conversion module for further storage and correlation; and
    wherein the phase-specific two-phase microwave pulse spin electrical signal corresponds to a minimum gain state of the microwave photonic Ising machine.

2. The microwave photonic Ising machine of claim 1, wherein
    the phase and electro-optical conversion module comprises a modulator and a nonlinear medium, the storage, correlation and photoelectric conversion module comprises an optical fiber, a signal correlation device and a photodetector, the signal correlation device comprises a beam splitting device, a spin connection module and a beam combining device, one output of the beam splitting device is connected to an input of the spin connection module, another output of the beam splitting device is connected to an input of the beam combining device, and an output of the spin connection module is connected to the input of the beam combining device;

the nonlinear medium is configured to convert the microwave pulse signal into a phase-random two-phase microwave pulse spin signal, the modulator is configured to modulate the phase-random two-phase microwave pulse spin signal and the optical signal into a phase-random two-phase microwave pulse spin optical signal, and the optical fiber is configured to store the phase-random two-phase microwave pulse spin optical signal, wherein the spin connection module is configured to correlate any two phase-random two-phase microwave pulse spin optical signals input into the spin connection module, so as to generate a phase-specific two-phase microwave pulse spin optical signal, the photodetector is configured to convert the phase-specific two-phase microwave pulse spin optical signal output by the beam combining device into the phase-specific two-phase microwave pulse spin electrical signal and output the phase-specific two-phase microwave pulse spin electrical signal to the nonlinear medium so as to form a closed loop, and a position of the optical fiber is exchangeable with a position of the signal correlation device; or the photodetector is configured to convert the phase-random two-phase microwave pulse spin optical signal into a phase-random two-phase microwave pulse spin electrical signal, the spin connection module is configured to correlate any two phase-random two-phase microwave pulse spin electrical signals input into the spin connection module, so as to generate the phase-specific two-phase microwave pulse spin electrical signal, and the beam combining device is configured to output the phase-specific two-phase microwave pulse spin electrical signal to the nonlinear medium so as to form the closed loop.

3. The microwave photonic Ising machine of claim 2, wherein the spin connection module is a programmable network comprising a one-way or at-least-two-way delay line network or comprising a feedback correlation network, and the programmable network is configured to perform a programmable correlation on the phase-random two-phase microwave pulse spin optical signal or the phase-random two-phase microwave pulse spin electrical signal.

4. The microwave photonic Ising machine of claim 2, wherein a part between the laser light source and the photodetector in which the optical signal passes is an optical path, the optical path further comprises one or at least two optical amplifiers for promoting a start oscillation; and a part between the photodetector and the modulator in which the electrical signal passes is a circuit, the circuit further comprises one or at least two electrical amplifiers and one or at least two electrical filters, the electrical filter is configured to filter the electrical signal, and a position of the electrical amplifier in the circuit is exchangeable with a position of the electrical filter in the circuit.

5. The microwave photonic Ising machine of claim 2, wherein the beam splitting device comprises a beam splitter and a wavelength division demultiplexer, and the beam combining device comprises a beam combiner and a wavelength division multiplexer.

6. The microwave photonic Tsing machine of claim 1, wherein, the phase and electro-optical conversion module comprises a modulator and a nonlinear medium, the storage, correlation and photoelectric conversion module comprises an optical fiber, a signal correlation device and a photodetector, the signal correlation device comprises a beam splitting device, a spin connection module and a beam combining device, one output of the beam splitting device is connected to an input of the spin connection module, another output of the beam splitting device is connected to an input of the beam combining device, and an output of the spin connection module is connected to the input of the beam combining device;

the modulator is configured to modulate the microwave pulse signal and the optical signal into a microwave pulse optical signal, the nonlinear medium is configured to convert the microwave pulse optical signal into a phase-random two-phase microwave pulse spin optical signal, and the optical liber is configured to store the phase-random two-phase microwave pulse spin optical signal, wherein the spin connection module is configured to correlate any two phase-random two-phase microwave pulse spin optical signals input into the spin connection module, so as to generate a phase-specific two-phase microwave pulse spin optical signal corresponding to the minimum gain state of the microwave photonic Ising machine, the photodetector is configured to convert the phase-specific two-phase microwave pulse spin optical signal output by the beam combining device into the phase-specific two-phase microwave pulse spin electrical signal and output the phase-specific two-phase microwave pulse spin electrical signal to the modulator so as to form a closed loop, and a position of the optical fiber is exchangeable with a position of the signal correlation device; or the photodetector is configured to convert the phase-random two-phase microwave pulse spin optical signal into a phase-random two-phase microwave pulse spin electrical signal, the spin connection module is configured to correlate any two phase-random two-phase microwave pulse spin electrical signals input into the spin connection module, so as to generate the phase-specific two-phase microwave pulse spin electrical signal corresponding to the minimum gain state of the microwave photonic Ising machine, and the beam combining device is configured to output the phase-specific two-phase microwave pulse spin electrical signal to the modulator so as to form a closed loop.

7. The microwave photonic Ising machine of claim 6, wherein the spin connection module is a programmable network comprising a one-way or at-least-two-way delay line network or comprising a feedback correlation network, and the programmable network is configured to perform a programmable correlation on the phase-random two-phase microwave pulse spin optical signal or the phase-random two-phase microwave pulse spin electrical signal.

8. The microwave photonic Ising machine of claim 6, wherein a part between the laser light source and the photodetector in which the optical signal passes is an optical path, the optical path further comprises one or at least two optical amplifiers for promoting a start oscillation; and a part between the photodetector and the modulator in which the electrical signal passes is a circuit, the circuit further comprises one or at least two electrical amplifiers and one or at least two electrical filters, the electrical filter is configured to filter the electrical signal, and a position of the electrical amplifier in the circuit is exchangeable with a position of the electrical filter in the circuit.

9. The microwave photonic Ising machine of claim 6, wherein the beam splitting device comprises a beam splitter and a wavelength division demultiplexer, and the beam combining device comprises a beam combiner and a wavelength division multiplexer.

10. The microwave photonic Ising machine of claim 1, wherein a loss of the optical fiber is less than or equal to 0.2 dB/km.

11. The microwave photonic Ising machine of claim 1, wherein the two phases are 0 or $\pi$.

12. The microwave photonics Ising machine of claim 1, wherein the laser light source is replaced with a laser pulse light source, and at a same time, the microwave pulse local oscillator source is replaced with a microwave local oscillator source; or the microwave pulse local oscillator source is replaced with a microwave local oscillator source, and at a same time, a pulse shaping device is further provided in the microwave photonic Ising machine; or the laser light source is replaceable with a laser pulse light source, and a synchronization device is further provided to synchronize a pulse of the laser pulse light source with a pulse of the microwave pulse local oscillator source.

13. A method of solving a combinatorial optimization problem based on the microwave photonic Ising machine of claim 1, comprising:

generating an optical signal by a laser light source, inputting the optical signal to a storage, correlation and photoelectric conversion module through a phase and electro-optical conversion module, converting the optical signal into an electrical signal and inputting the electrical signal to the phase and electro-optical conversion module, so as to cause an oscillation of a closed loop;

generating a microwave pulse signal by a microwave pulse local oscillator source, and converting, by the phase and electro-optical conversion module, the microwave pulse signal, the optical signal and the electrical signal into a phase-random two-phase microwave pulse spin optical signal, wherein the phase-random two-phase microwave pulse spin optical signal is stored and correlated by the storage, correlation and photoelectric conversion module to generate a phase-specific two-phase microwave pulse spin optical signal, and the phase-specific two-phase microwave pulse spin optical signal is converted into a phase-specific two-phase microwave pulse spin electrical signal; or the phase-random two-phase microwave pulse spin optical signal is converted into a phase-random two-phase microwave pulse spin electrical signal, and the phase-random two-phase microwave pulse spin electrical signal is correlated to generate a phase-specific two-phase microwave pulse spin electric signal; and outputting the phase-specific two-phase microwave pulse spin electrical signal to the phase and electro-optical conversion module so as to form a closed microwave photonic loop, wherein a gain of the microwave photonic loop is gradually increased so that the phase-random two-phase microwave pulse spin optical signal or the phase-random two-phase microwave pulse spin electrical signal reaches a specific distribution corresponding to a minimum gain state of the microwave photonic loop, wherein the minimum gain corresponds to an optimal solution of the combinatorial optimization problem.

* * * * *